Patented Dec. 11, 1951

2,578,292

UNITED STATES PATENT OFFICE 2,578,292

DISODIUM - N,N' - DIMETHYL-p-PHENYLENE-DIAMINOMETHANE SULFONATE AND PROCESS FOR PREPARATION

Thomas S. Donovan, Ontario, N. Y., assignor to Eastman Kodak Company, Rochester, N. Y., a corporation of New Jersey No Drawing. Application February 17, 1950
Serial No. 144,866

10 Claims. (Cl. 260—510)

This invention relates to the disodium salt of N,N'-dimethyl-p-phenylenediaminomethane sulfonic acid and a process for its preparation. This salt is useful as a dye for furs, leather, wool, etc. and can be used as a low contrast developing agent in photographic processes. This compound has the following formula:

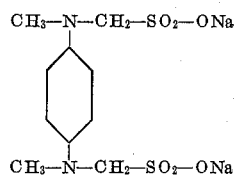

The corresponding aniline compound, viz. the sodium salt of N-methylphenylaminomethane sulfonic acid having the formula:

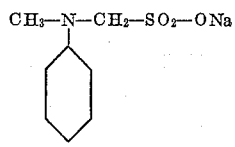

is a known compound and has practically no utility whatsoever as a dye or as a photographic developer. It was, accordingly, quite surprising to find that the p-phenylenediamine compound was useful as a fur dye and as a low contrast developing agent whereas the aniline compound has no such utility. This can be illustrated by the following experiment. The aniline compound was prepared by the reaction of aniline with sodium hydroxymethane sulfonic acid in an aqueous solution to give glistening white platelets which were purified and dissolved to the extent of 0.5 gram thereof in one liter of water. 5 grams of white woolen yarn (pre-wet) was immersed therein for 30 minutes followed by the addition of 1 ml. of $H_2O_2$ solution (30%) and then the yarn was allowed to stand at room temperature for 24 hours in this solution. No dyeing of the wool was noted.

On the other hand, I have found that the p-phenylenediamine compound produces noteworthy results under similar circumstances, thus, the following data illustrate the results under varying conditions which arise from first treating 5 grams of white wool (pre-wet and mordanted if a mordant is used) with varying quantities of the dyestuff (disodium - N,N' - dimethyl-p-phenylenediaminomethane sulfonate) dissolved in one liter of water. After 30 minutes of this treatment, 1 ml. of $H_2O_2$ solution (30%) was added and the entire mixture was then stirred. The wool was allowed to stand 24 hours in this dye bath whereupon the wool was removed, washed thoroughly with soap and water, and dried. The mordants, when employed, were applied by standard techniques as exemplified in the book, "Fur Dressing and Fur Dyeing" by Austin published by D. Van Nostrand, 1922. In some instances another dye designated as a co-dye was employed along with my new dyestuff; its effect on the final dyed wool is appropriately noted.

| Wgt. of Dyestuff | Wgt. of Co-Dye | Mordant | pH | Color Dyed |
|---|---|---|---|---|
| G. | G. | | | |
| 1.0 | | | neutral | blue-grey. |
| 1.0 | | | slightly alkaline ($Na_2CO_3$) | light-grey. |
| 1.0 | | | slightly acid (HCl) | Do. |
| 1.0 | | Cu | neutral | dull-black. |
| 1.0 | | Cr | do | deep-blue. |
| 1.0 | | Fe | do | dark-grey. |
| 1.0 | | | slightly acid (HOAc) | red-brown. |
| 1.0 | | Cu | do | dark-brown. |
| 1.0 | 0.25 (m-toluylene diamine) | | neutral | blue-black. |
| 0.75 | do | Cu | do | Do. |
| 0.75 | 0.25 (2,4-di-amino-anisole) | | do | Do. |
| 0.75 | 0.1 (2,5-diamino-toluene sulfate) | | do | glossy-black. |

Similar results can be obtained when dyeing furs and leather depending upon the initial color of the material.

The new dyestuff which I have discovered can be prepared by reacting one mol of N,N'-dimethyl-p-phenylenediamine with 2 mols of a composition of matter selected from the group consisting of sodium hydroxymethane sulfonate, a mixture of sodium bisulfite and formalin and a mixture of sodium bisulfite and paraformaldehyde in the presence of water.

It is an object of my invention to provide the disodium salt of N,N'-dimethyl-p-phenylenediaminomethane sulfonic acid. Another object of my invention is to provide a process for the preparation of this compound. Further objects are apparent from a consideration of this specification and include providing a new fur, wool and leather dye and a low contrast developing agent for photographic processes.

The product of my invention is a white to tan crystalline solid when in the form and purity in which I have prepared it. It is soluble in water but not in most organic solvents. It has a melting point somewhat above 270° C. It is quite stable when dry. In aqueous solution it is subject to ready oxidation by the oxygen in the air or by any other oxidizing agent such as the peroxides, dichromates, silver halides, etc.

Advantageously, I can prepare my new compound by suspending N,N'-dimethyl-p-phenylenediamine in water with efficient stirring whereupon an aqueous solution of sodium hydroxymethane sulfonate is added with continued stirring. This mixture is then heated gradually until the reaction is completed which will be indicated by the complete dissolution of the reactants in the water. This heating can be effectively performed in the range of from about 50° C. to about 100° C. and is suitably carried out on a steam bath. Thus, the temperature of the reaction is advantageously between 85° and 95° C. Lower temperatures than 50° C. result in a reaction rate which is too slow to be practicable. Temperatures above 100° C. result in some decomposition under ordinary conditions. Upon completion of the reaction, it is advantageous to treat the reaction mixture with decolorizing carbon prior to filtration; after filtering and upon slowly cooling the solution, crystals of the product appear and can be separated by filtration.

In addition to the above particular way of carrying out my process, it is also possible to add the N,N'-dimethyl-p-phenylenediamine in solid form (preferably finely divided) to a solution of the sodium hydroxymethane sulfonate which is kept well stirred. Furthermore, it is also possible to add the sodium hydroxymethane sulfonate in solid form (preferably finely divided) to an aqueous suspension of the N,N'-dimethyl-p-phenylenediamine which is kept well stirred.

The sodium hydroxymethane sulfonate can be prepared by mixing equivalent amounts of sodium bisulfite and aqueous formalin or paraformaldehyde. These reactants can be mixed in the aqueous suspension containing the N,N'-dimethyl-p-phenylenediamine; in so doing, it is equivalent to adding sodium hydroxymethane sulfonate as such. The sodium bisulfite, in effect, reacts with the formalin or the paraformaldehyde to form sodium hydroxymethane sulfonate.

Generally, the amount of water present during the course of the reaction of the N,N'-dimethyl-p-phenylenediamine should be sufficient to dissolve all of the product that can be formed. Some excess of water is advantageously employed; however, the amount of water used is not critical. Smaller amounts of water reduce the effectiveness of the reaction whereas a large excess of water results in making the final crystallization of the product a more tedious operation by reason of the larger amount of water which must be evaporated.

The sodium hydroxymethane sulfonate is advantageously employed in excess of two mol proportions per mol proportion of the N,N'-dimethyl-p-phenylenediamine for two reasons in particular. First, in order that the completion of the reaction can be readily detected upon the complete dissolution of the latter compound, and second, because this compound is quite toxic or poisonous to human beings and the absence of any trace of it in the product, which is of itself quite harmless, is greatly to be desired. The mol proportions can accordingly be varied from slightly above 2 to 1 (sodium hydroxymethane sulfonate to N,N'-dimethyl-p-phenylenediamine) up to any desired proportion. Advantageously, a ratio of from 2.1 to 1 up to 2.5 to 1 (from about 5% to about 25% excess) can be employed; however, higher or lower proportions can also be employed since there is nothing critical involved.

In order to further illustrate the manner of practicing my invention, reference is made to the following working example:

*Example*

One gram mol (136 grams) of N,N'-dimethyl-p-phenylenediamine was suspended in 2,000 ml. of water. With good mechanical stirring, a solution containing 2.24 gram moles (300 grams) of sodium hydroxymethane sulfonate in 500 ml. of water was added. Stirring was continued and the mixture was heated until solution was complete. The solution was treated with decolorizing carbon and filtered. On slow cooling of this solution, tan granular crystals appeared. These were filtered off and dried at room temperature. Concentration and cooling of the mother liquor produced a second crop of crystals which were removed and dried in the same manner as before.

A purified sample was analyzed and the following results which were thereby actually found were compared with those based on the calculated values for $C_{10}H_{14}N_2O_6S_2Na_2$.

Calculated: N, 7.6%; S, 17.4%; Na, 12.5%.
Found: N, 8.2%; S, 17.0%; Na, 12.5%.

What I claim as my invention and desire to secure by Letters Patent of the United States is:

1. Disodium salt of N,N'-dimethyl-p-phenylenediaminomethane sulfonic acid having the formula:

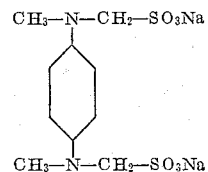

2. A process for preparing the disodium salt of N,N'-dimethyl-p-phenylenediaminomethane sulfonic acid comprising reacting N,N'-dimethyl-p-phenylenediamine with sodium hydroxymethane sulfonate.

3. A process for preparing the disodium salt of N,N'-dimethyl-p-phenylenediaminomethane sulfonic acid comprising reacting N,N'-dimethyl-p-phenylenediamine with sodium hydroxymethane sulfonate in the presence of water.

4. A process for preparing the disodium salt of N,N'-dimethyl-p-phenylenediaminomethane sulfonic acid comprising reacting N,N'-dimethyl-p-phenylenediamine with sodium hydroxymethane sulfonate in the presence of sufficient water to dissolve the disodium salt of N,N'-dimethyl-p-phenylenediaminomethane sulfonic acid as it forms.

5. A process for preparing the disodium salt of N,N'-dimethyl-p-phenylenediaminomethane sulfonic acid comprising reacting N,N'-dimethyl-p-phenylenediamine with sodium hydroxymethane sulfonate at a temperature of from 50° to 100° C.

in the presence of sufficient water to dissolve the disodium salt of N,N'-dimethyl-p-phenylenediaminomethane sulfonic acid as it forms.

6. A process for preparing the disodium salt of N,N'-dimethyl-p-phenylenediaminomethane sulfonic acid comprising reacting N,N'-dimethyl-p-phenylenediamine with sodium hydroxymethane sulfonate at a temperature of from 85° to 95° C. in the presence of sufficient water to dissolve the disodium salt of N,N'-dimethyl-p-phenylenediaminomethane sulfonic acid as it forms.

7. A process for preparing the disodium salt of N,N'-dimethyl-p-phenylenediaminomethane sulfonic acid comprising reacting one mol proportion of N,N'-dimethyl-p-phenylenediamine with at least 2 mol proportions of sodium hydroxymethane sulfonate at a temperature of from 50° to 100° C. in the presence of sufficient water to dissolve the disodium salt of N,N'-dimethyl-p-phenylenediaminomethane sulfonic acid as it forms.

8. A process for preparing the disodium salt of N,N'-dimethyl-p-phenylenediaminomethane sulfonic acid comprising reacting one mol proportion of N,N'-dimethyl-p-phenylenediamine with at least 2 mol proportions of sodium hydroxymethane sulfonate at a temperature of from 85° to 95° C. in the presence of sufficient water to dissolve the disodium salt of N,N'-dimethyl-p-phenylenediaminomethane sulfonic acid as it forms.

9. A process for preparing the disodium salt of N,N'-dimethyl-p-phenylenediaminomethane sulfonic acid comprising reacting one mol proportion of N,N'-dimethyl-p-phenylenediamine with from 2.1 to 2.5 mol proportions of sodium hydroxymethane sulfonate at a temperature of from 50° to 100° C. in the presence of sufficient water to dissolve the disodium salt of N,N'-dimethyl - p - phenylenediaminomethane sulfonic acid as it forms.

10. A process for preparing the disodium salt of N,N'-dimethyl-p-phenylenediaminomethane sulfonic acid comprising reacting one mol proportion of N,N'-dimethyl-p-phenylenediamine with from 2.1 to 2.5 mol proportions of sodium hydroxymethane sulfonate at a temperature of from 85° to 95° C. in the presence of sufficient water to dissolve the disodium salt of N,N'-dimethyl-p-phenylenediaminomethane sulfonic acid as it forms.

THOMAS S. DONOVAN.

REFERENCES CITED

The following references are of record in the file of this patent:

UNITED STATES PATENTS

| Number | Name | Date |
| --- | --- | --- |
| 2,221,131 | Fischer et al. | Nov. 12, 1940 |

FOREIGN PATENTS

| Number | Country | Date |
| --- | --- | --- |
| 679,293 | Germany | Aug. 4, 1939 |

OTHER REFERENCES

Delepine et al., Chem. Abstracts, vol. 16, page 1933 (1922).